US012798930B1

(12) United States Patent
Curtis

(10) Patent No.: US 12,798,930 B1
(45) Date of Patent: Nov. 17, 2026

(54) PROTECTION SYSTEM FOR DEFINING A PROTECTIVE AREA

(71) Applicant: Pacific Cascade Parking Equipment Corporation, Vancouver, WA (US)

(72) Inventor: Mark A. Curtis, Vancouver, WA (US)

(73) Assignee: Pacific Cascade Parking Equipment Corporation, Vancouver, WA (US)

( * ) Notice: Subject to any disclaimer, the term of this patent is extended or adjusted under 35 U.S.C. 154(b) by 270 days.

(21) Appl. No.: 18/533,663

(22) Filed: Dec. 8, 2023

Related U.S. Application Data

(60) Provisional application No. 63/431,593, filed on Dec. 9, 2022.

(51) Int. Cl.
*B66C 23/88* (2006.01)
*B66C 23/36* (2006.01)

(52) U.S. Cl.
CPC .............. *B66C 23/88* (2013.01); *B66C 23/36* (2013.01); *B66C 2700/0378* (2013.01)

(58) Field of Classification Search
CPC .. B66C 23/88; B66C 23/36; B66C 2700/0378
See application file for complete search history.

(56) References Cited

U.S. PATENT DOCUMENTS

| | | | | |
|---|---|---|---|---|
| 3,349,531 | A | 10/1967 | Watson | |
| 3,521,413 | A | 7/1970 | Scott | |
| 3,552,073 | A | 1/1971 | Millerbernd | |
| 3,563,502 | A | 2/1971 | Dayson | |
| 3,572,223 | A | 3/1971 | Vierregger | |
| 3,782,766 | A * | 1/1974 | Teel | B60R 19/02 49/34 |
| 3,812,978 | A * | 5/1974 | Roland | B66C 23/94 212/294 |
| 3,837,752 | A | 9/1974 | Shewchuk | |
| 4,059,934 | A | 11/1977 | Hayamizu | |
| 4,154,037 | A | 5/1979 | Anderson | |
| 4,434,901 | A * | 3/1984 | Gehl | B66C 23/94 340/436 |
| 4,524,953 | A * | 6/1985 | Phillips | E01F 13/028 49/34 |
| 4,619,456 | A | 10/1986 | Meggs | |
| 5,039,100 | A | 8/1991 | Cortese | |
| 5,088,683 | A | 2/1992 | Briden | |

(Continued)

FOREIGN PATENT DOCUMENTS

WO WO-2020244010 A1 * 12/2020 ............. G08B 21/02

OTHER PUBLICATIONS

WO-2020244010-A1 English Translation (Year: 2020).*

*Primary Examiner* — Michael T. Walsh
(74) *Attorney, Agent, or Firm* — Polsinelli PC

(57) ABSTRACT

In one example of the present disclosure, a system for defining a protective area for a body of a vehicle is provided. The system may include a first elongated member and a second elongated member coupled to the body at a first and second coupling positions respectively to extend outwardly from the body, each elongated member having a first end and a second end, the first ends are coupled to the body and the second ends are extending distally from the first end. The system may further include a protective line extending between the respective second ends of the first and second elongated members to define a protective area.

17 Claims, 13 Drawing Sheets

(56) References Cited

U.S. PATENT DOCUMENTS

| | | | | |
|---|---|---|---|---|
| 5,160,111 | A | 11/1992 | Hugron | |
| 5,282,963 | A | 2/1994 | Hull et al. | |
| 5,481,835 | A | 1/1996 | Bloom | |
| 5,558,455 | A | 9/1996 | Emery | |
| 5,855,443 | A | 1/1999 | Faller et al. | |
| 6,042,080 | A | 3/2000 | Shepherd et al. | |
| 6,098,361 | A | 8/2000 | Roten et al. | |
| 6,102,373 | A * | 8/2000 | Amsinger | B66C 23/94 212/280 |
| 6,141,928 | A | 11/2000 | Platt | |
| 6,199,814 | B1 | 3/2001 | Lee | |
| 6,240,689 | B1 | 6/2001 | Haddad et al. | |
| 6,250,835 | B1 | 6/2001 | Chamel | |
| 6,289,636 | B1 | 9/2001 | White et al. | |
| 6,305,656 | B1 | 10/2001 | Wemyss | |
| 6,390,436 | B2 | 5/2002 | Barnes et al. | |
| 6,422,783 | B1 | 7/2002 | Jordan | |
| 6,427,965 | B1 | 8/2002 | McCracken | |
| 6,457,895 | B1 | 10/2002 | Salman | |
| 6,477,749 | B1 | 11/2002 | Reiter | |
| 6,540,196 | B1 | 4/2003 | Ellsworth | |
| 6,739,567 | B1 * | 5/2004 | Curtis | E01F 9/677 40/607.01 |
| 7,188,821 | B2 | 3/2007 | Curtis | |
| 7,377,474 | B2 | 5/2008 | Curtis | |
| 7,862,197 | B2 | 1/2011 | Gebhard | |
| 8,235,348 | B1 * | 8/2012 | Curtis | E01F 9/629 248/548 |
| 8,739,453 | B1 | 6/2014 | Conner | |
| 9,153,152 | B1 * | 10/2015 | Elmer | H01F 7/0221 |
| 10,077,171 | B2 * | 9/2018 | Chustz | B66C 15/06 |
| 11,479,988 | B2 * | 10/2022 | Curtis | E04H 12/2253 |
| 2002/0166275 | A1 | 11/2002 | Broadwell et al. | |
| 2020/0173189 | A1 * | 6/2020 | Curtis | E04H 12/2238 |
| 2021/0198087 | A1 * | 7/2021 | Mastrosimone | B66C 15/06 |

* cited by examiner

PROTECTION SYSTEM FOR DEFINING A PROTECTIVE AREA

CROSS REFERENCE TO RELATED APPLICATIONS

This application claims the benefit of U.S. Provisional Application No. 63/431,593, filed Dec. 9, 2022, and entitled “PROTECTION SYSTEM FOR DEFINING A PROTECTIVE AREA”, the disclosure of which is hereby expressly incorporated by reference herein in its entirety.

FIELD

The present disclosure generally pertains to a protective system. More specifically, the present disclosure pertains to a protective system for construction vehicles or equipment.

BACKGROUND

A barricade is a structure that outlines or blocks a dangerous area and warns other of a boundary not to be crossed to ensure personal or public safety. Barricades can be used in several industries, including the construction industry, to warn workers and the public of potential dangers.

SUMMARY

This summary is provided to introduce a selection of concepts in a simplified form that are further described below in the detailed description. This summary is not intended to identify key features of the claimed subject matter, nor is it intended to be used as an aid in determining the scope of the claimed subject matter.

In accordance with one embodiment of the present disclosure, a system for defining a protective area for a vehicle body is described. The system may include a first elongated member coupled to the vehicle body at a first coupling position to extend outwardly from the vehicle body, the first elongated member having a first end and a second end, the first end coupled to the vehicle body and the second end extending distally from the first end; a second elongated member coupled to the vehicle body at a second coupling position to extend outwardly from the vehicle body, the second elongated member having a first end and a second end, the first end coupled to the vehicle body and the second end extending distally from the first end; and a protective line extending between the respective second ends of the first and second elongated members to define a protective area.

In accordance with another embodiment of the present disclosure, a method of defining a variable protective area relative to a ground surface is described. The method may include obtaining a vehicle, wherein the vehicle can move between a first position and a second position; defining a first protective area for the vehicle when the vehicle is in the first position, wherein the first protective area is defined at least in part by a first elongated member coupled to a body of the vehicle, a second elongated member coupled to the body of the vehicle, and a protective line extending between the first and second elongated members; and defining a second protective area for the vehicle when the vehicle is in the second position, wherein the second protective area is defined at least in part by the first elongated member coupled to the body of the vehicle, the second elongated member coupled to the body of the vehicle, and the protective line extending between the first and second elongated members.

In any of the embodiments described herein, the first and/or second elongated member may include a magnetic attachment assembly at the first end, the vehicle body may be capable of carrying a magnetic current, and the magnetic attachment assembly may be configured to couple the first and/or second elongated member to the vehicle body.

In any of the embodiments described herein, the magnetic attachment assembly may include a biasing member for pivoting the first and/or second elongated member relative to the magnetic attachment assembly in response to an object contacting the first and/or second elongated member.

In any of the embodiments described herein, the biasing member is a spring.

In any of the embodiments described herein, a tool may be configured to uncouple the first and/or second elongated member from the vehicle body.

In any of the embodiments described herein, the first and/or second elongated member may be configured to uncouple from the vehicle body in response to a force being applied to the elongated member along a first direction.

In any of the embodiments described herein, the system may further comprise a third elongated member coupled to the vehicle body at a third coupling position to extend outwardly from the vehicle body, the third elongated member having a first end and a second end, the first end coupled to the vehicle body and the second end extending distally from the first end, wherein the protective line may be received at the second end of the third elongated member.

In any of the embodiments described herein, the first and/or second elongated member may be extendable such that the first elongated member can have a variable length.

In any of the embodiments described herein, the protective area may extend outwardly from the vehicle body by a length of at least 5 feet.

In any of the embodiments described herein, the first elongated member has a first length and the second elongated member has a second length, and the first length may be different than the second length.

In any of the embodiments described herein, the first protective area may be different from the second protective area.

In any of the embodiments described herein, the first protective area may not overlap with the second protective area.

In any of the embodiments described herein, the first elongated member may couple to the body of the vehicle at a first position, and the second elongated member may couple to the body of the vehicle at a second position.

In any of the embodiments described herein, the first and second elongated members may remain fixed at the first and second positions as the vehicle moves between the first position and the second position.

In any of the embodiments described herein, the first and second elongated members may each include a first and second end, and the protective line may extend between the second ends of the first and second elongated members.

In any of the embodiments described herein, the method may further comprise removing the first and second protective areas by decoupling the first and second elongated members from the body of the vehicle.

In any of the embodiments described herein, the vehicle may be a crane having a swing radius, and wherein the first and second protective areas surround the swing radius of the crane.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative examples, in which the principles of the disclosure are utilized, and the accompanying drawings of which:

DETAILED DESCRIPTION

Figure 1A:
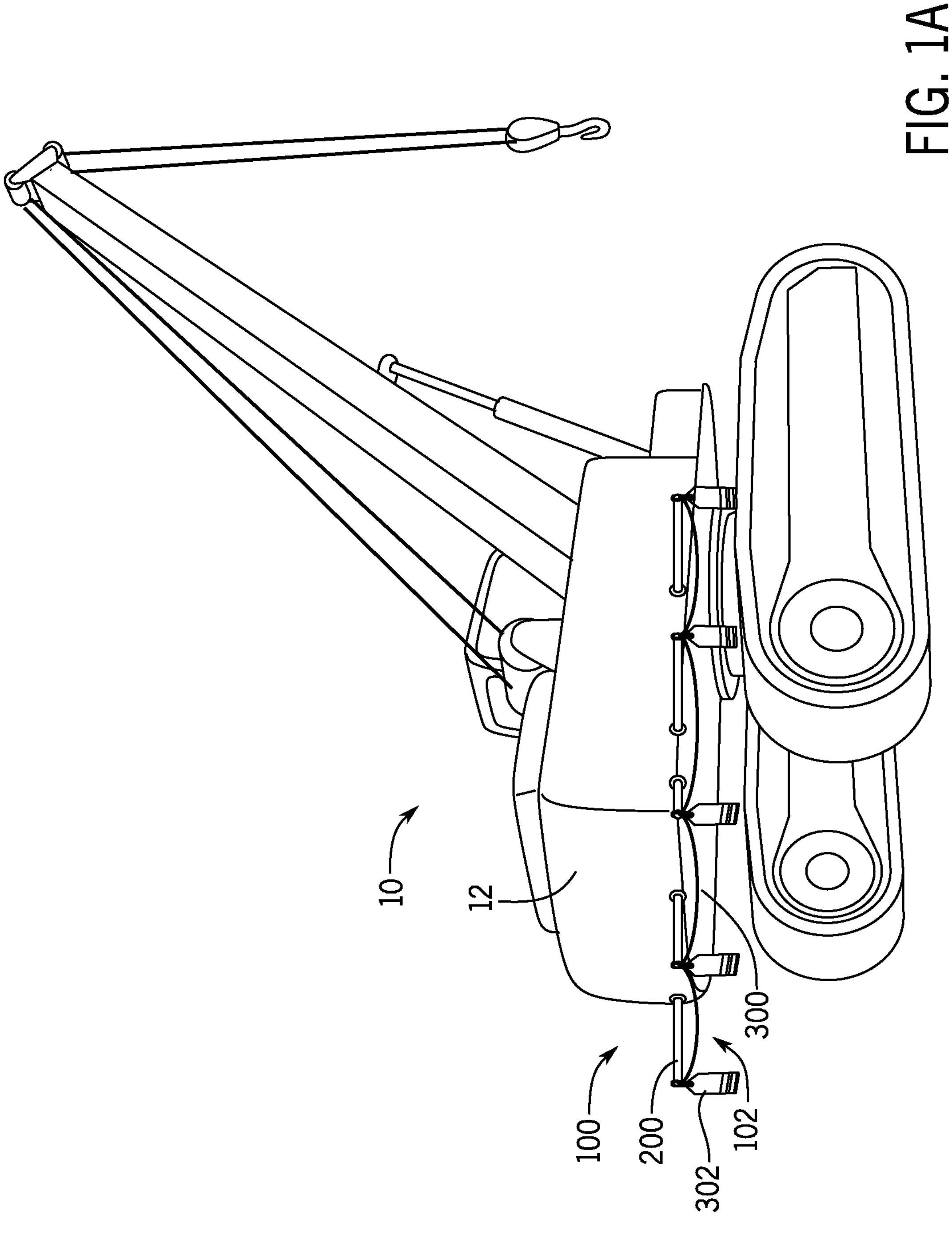
FIG. 1A illustrates a perspective view of a protective system installed on a vehicle in accordance with one or more embodiments of the present disclosure.

Workers and other personal at a construction site can be exposed to several potential hazards while at the construction site. Some of these hazards can be from machinery, equipment, or vehicles that are operating at the construction site. For example, equipment or vehicles that can hoist loads (such as cranes and derricks, for instance), can potentially pinch or crush a worker against a part of the equipment, vehicle, or another object. To help mitigate these potential hazards, construction sites can undergo several safety measures which can help limit the workers' exposure to these hazards. In the example of the hoisting equipment or vehicles, for instance, a safety barricade can be erected that surrounds the equipment or vehicle. This safety barricade can alert workers to the potential hazards from the hoisting equipment or vehicle and thereby prevent situations where a worker unknowingly enters a hazardous area.

Although safety barricades can be a very useful tool for mitigating hazards at a construction site, these barricades can be time-consuming and costly to install. These time and cost concerns can be especially prevalent in situations where the safety barricades need to be frequently moved. For example, in some situations, a crane may need to operate at several different locations within a construction site. In addition, the crane may move within a swing radius, which is the area in which all of the crane (including the boom and hook) and any load hoisted by the crane can be positioned. In some examples, this swing radius area can form a circular shape around the crane, with the circumference of this shape defining the outer range that any component of the crane (or load) can reach during operation. Requiring workers to uninstall and reinstall the safety barricades every time the crane moves to a different location can easily become a costly and time-consuming affair. In addition, if barricade adjustment is incorrectly installed or inadvertently overlooked by the workers, the movement of the crane can become a safety hazard.

The present disclosure can address these and other issues with safety barricades by providing an integrated protective system that can move with the equipment or vehicle. In some examples, this protective system can include one or more elongated members that are linked together by a protective line. These elongated members can attach to the equipment or vehicle and can extend outwards from the equipment or vehicle. The protective line can extend from the end of one elongated member to the end of another elongated member, so that the protective line and the elongated members define a protective area around the equipment or vehicle.

This protective area can function similar (or identical) to a safety barricade. For instance, this protective area can warn nearby workers or other personal to the potential hazards from the equipment or vehicle. This protective system can remain fixed to the equipment or vehicle so that when the equipment or vehicle moves, so does the protective system. By having a protective system that moves with equipment or vehicle, workers no longer need to repeatedly take down and setup safety barricades around hazardous equipment or vehicles. These and other advantages of the present disclosure will be described in more detail herein.

Figure 1B:
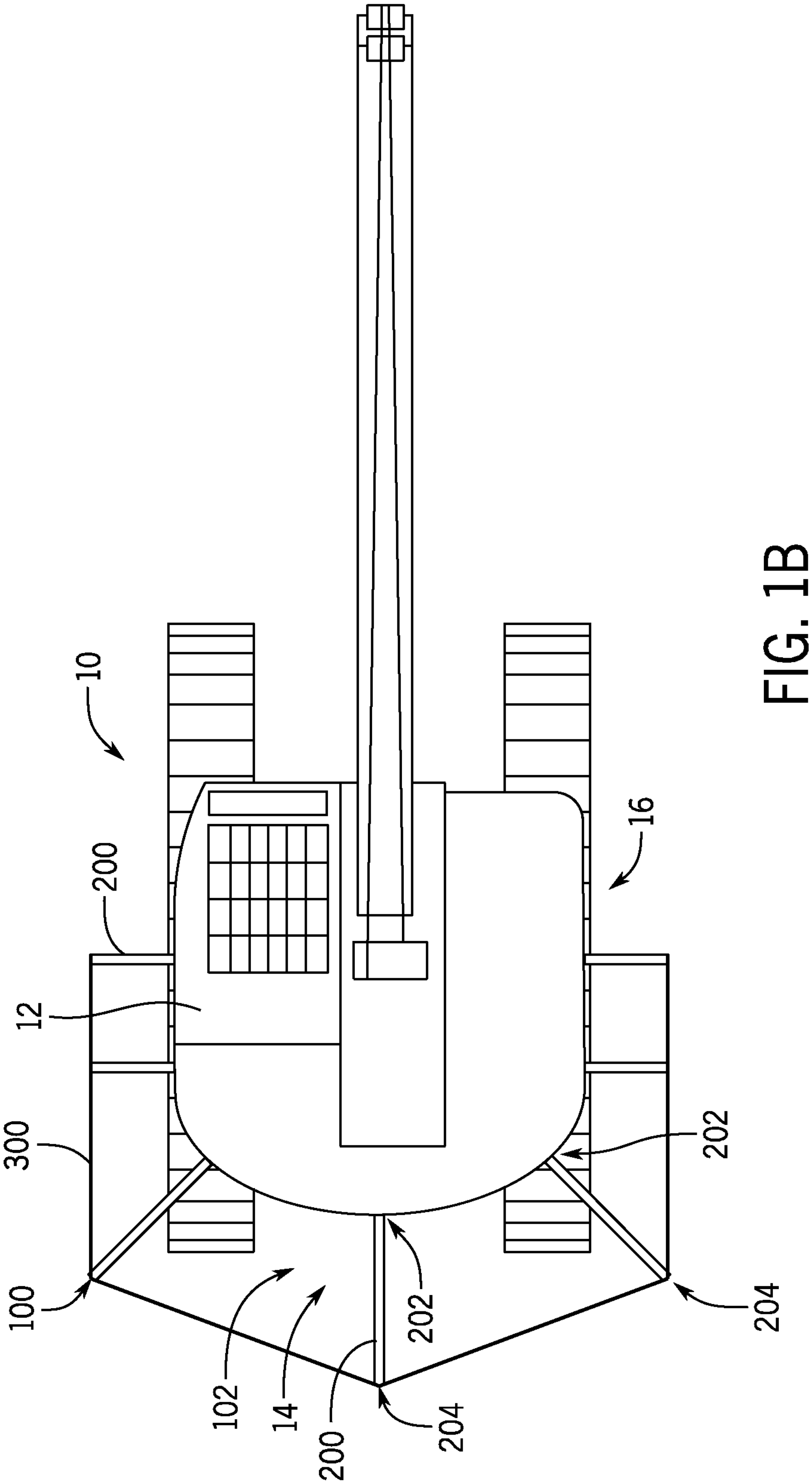
FIG. 1B illustrates a top view of the protective system installed on the vehicle of FIG. 1A.

FIGS. 1A and 1B illustrate a protective system 100 installed on a vehicle 10. As shown in the illustrated embodiment, the protective system 100 can couple to the vehicle 10 to form a protective area 102 that surrounds at least a portion of the vehicle 10. This protective area 102 can define the potentially hazardous space that surrounds the vehicle 10. For example, the vehicle 10 can be a crane and the protective area 102 can surround the crane along the area where a worker is at a great risk of being pinched or crushed by the crane or other object. In some examples, the protective area 102 can be established around the swing radius of the crane (e.g., the swing radius falls within the established protective area 102) or around the swing radius of the vehicle 10 (e.g., the moving portion of the vehicle 10 excluding the crane).

Although the illustrated embodiments show the vehicle 10 as a crane, utilizing the protective system 100 with other vehicles and equipment is within the scope of the present disclosure. As one example, the protective system 100 can couple to other construction vehicles or equipment, such as an excavator, a bulldozer, a paver, forklift, or drill, to form a protective area 102 around the vehicle or equipment. In some embodiments, the protective system 100 can couple to a fixed or temporary structure, such as a building or scaffolding, to form a protective area 102 around at least a portion of the structure or around an object near the structure.

Referring back to the illustrated embodiment, the protective system 100 can include one or more elongated members 200 and a protective line 300, which together can define the protective area 102 around the vehicle 10. The elongated members 200 can define the length of the protective area 102 (e.g., how far the protective area 102 extends away from the vehicle 10). In some instances, the elongated members 200 can also define at least a part of the outer boundary of the protective area 102. Additionally, the protective line 300 (and, in some examples, both the protective line 300 and the elongated members 200) can define at least a part of the outer boundary of the protective area 102. For example, as shown in FIGS. 1A and 1B, the protective line 300 can extend from one elongated member 200 to an adjacent elongated member 200. By spanning the gap between adjacent elongated members 200, the protective line 300 defines the outer boundary of the protective area 102 between these elongated members 200.

The protective system 100 can be adjustable to form protective areas 102 of various shapes and sizes. To adjust the size of the protective area 102, the length of the elongated members 200 can be adjusted. As will be described in more detail herein, in some embodiments, the elongated members 200 can include a first end 202 coupled to a body 12 of the vehicle 10 (e.g., a frame, chassis, or other portion of the vehicle 10) and a second end 204 that extends distally away from the first end 202 and outwardly from the body 12 of the vehicle 10. This distance that the elongated members 200 extend from the first end 202 to the second end 204 can define how far the protective area 102 extends outwardly from the vehicle 10. Accordingly, to increase the size of the protective area 102, the length of the elongated members 200 can also be increased. Similarly, to decrease the size of the protective area 102, the length of elongated members 200 can be decreased. In some examples, the elongated members 200 extend at least 5 feet, 10 feet, 15 feet, 20 feet, 25 feet, 30 feet, or other distance from the body 12 of the vehicle 10. In some embodiments, the length of one elongated member 200 can be different than the length of a second elongated member 200. For instance, as shown in FIG. 1B, the elongated members 200 near the end 14 of the vehicle 10 can be longer than the elongated members 200 along the sides 16 of the vehicle 10.

The protective system 100 can be adjusted in several ways to form a desired shape and size of the protective area 102. In one example, the protective system 100 can be adjusted by adding or removing the number of elongated members 200 that are attached to the vehicle 10. In the illustrated embodiment, the protective system 100 includes 7 elongated members 200 positioned around the body 12 of the vehicle 10. However, in other embodiments, the protective system 100 can include 1, 2, 3, 4, 5, 6, 8, 9, 10, or more elongated members 200. Additionally, or alternatively, the protective system 100 can be adjusted by increasing or decreasing the spacing between adjacent elongated members 200.

Figure 1C:
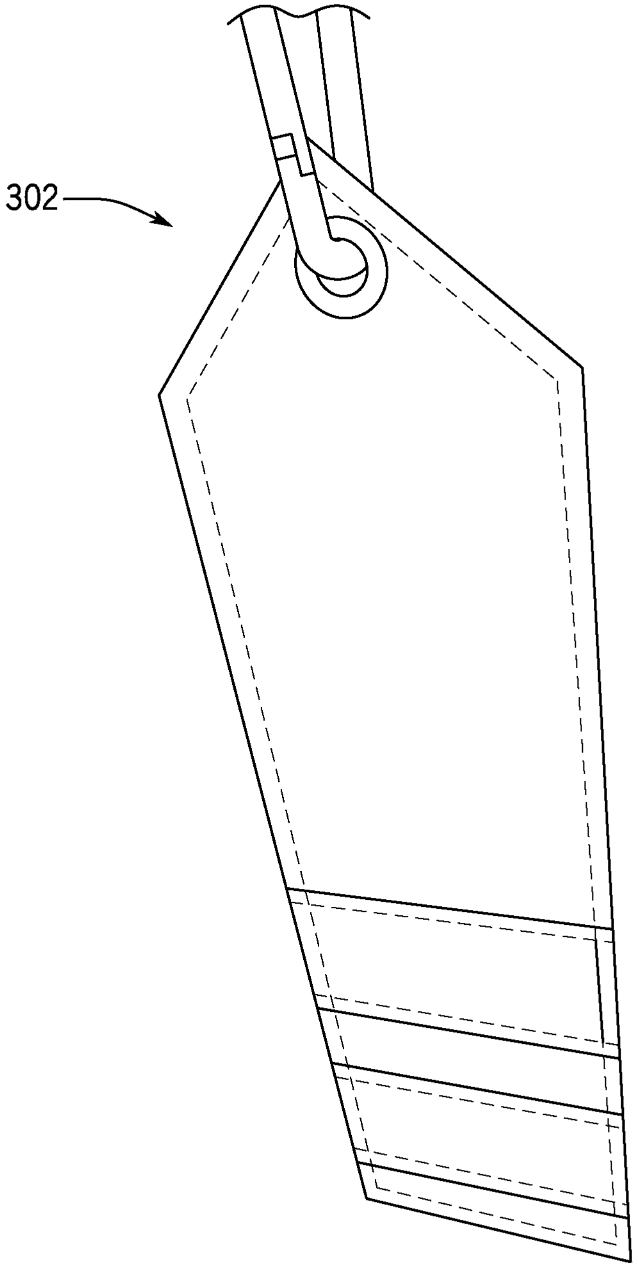
FIG. 1C illustrates a perspective view of a marker member in accordance with one or more embodiments of the present disclosure.

In some examples, the protective system 100 can include one or more marker members 302, which can improve the visibility of the protective system 100. As shown in FIGS. 1A and 1C, the marker member 302 can be an elongated flag, or other suitable delineator, which can be coupled to a portion of the protective system 100. For instance, as shown in FIG. 1A, the marker members 302 can couple to the elongated members 200 at or near the second end 204 such that the marker members 302 hang downwards or are otherwise perpendicular to the elongated members 200. In some embodiments, the marker members 302 can also couple to the protective line 300 and thus be positioned between adjacent elongated members 200. Arranging the marker members 302 in these manners (e.g., perpendicular to the elongated members 200, coupled to the protective line 300, etc.) can improve the visibility of the protective system 100, as the length of the marker member 302 can be greater than the thickness of the elongated members 200 or protective line 300. Thus, the marker members 302 can provide a larger identifying surface for nearby personnel to see, which can thereby render the protective system 100 more easily recognizable. Additionally, in some embodiments, the marker members 302 can be formed of a high visibility material or color and can include one or more reflective portions or lights, all of which can improve the visibility of the protective system 100 and help nearby personnel locate the protective area 102.

Figure 2A:
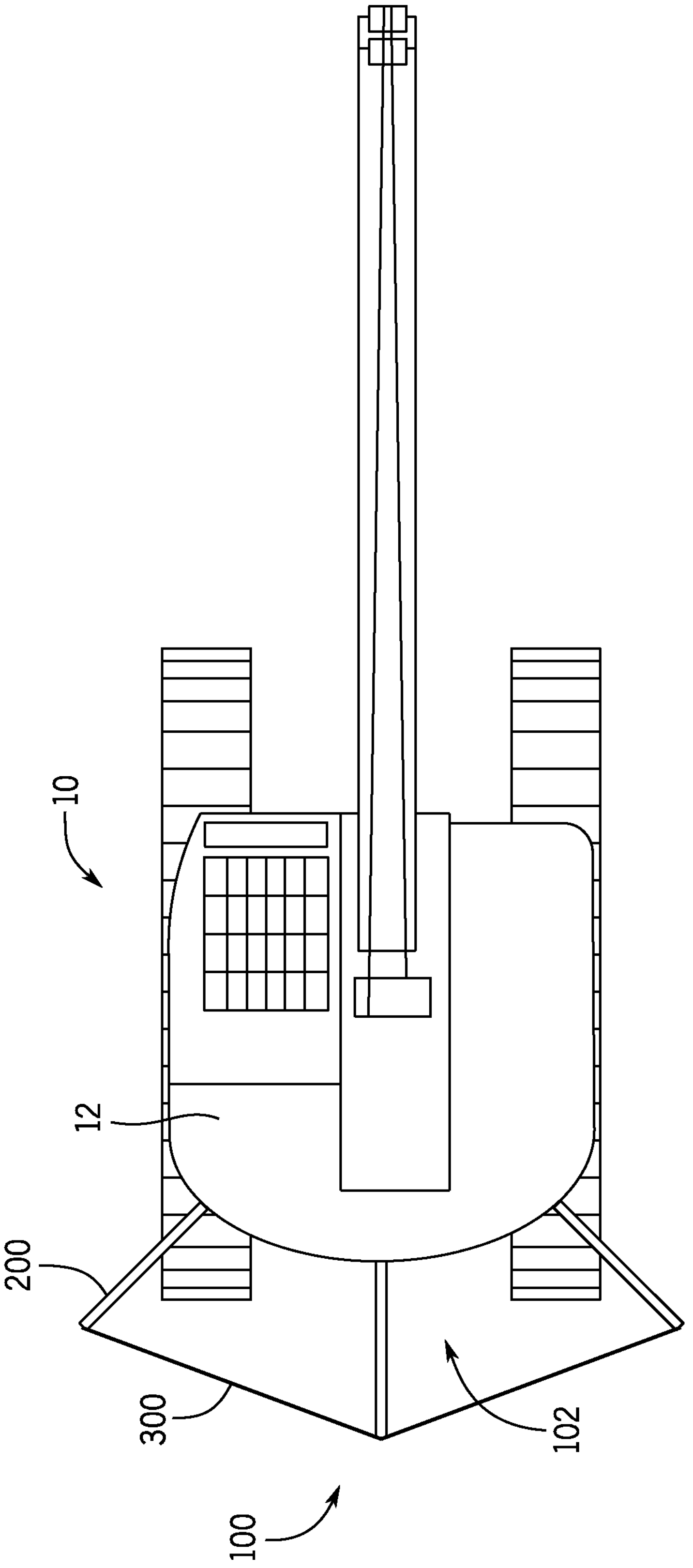
FIGS. 2A-2C illustrate top views of various layouts of a protective system installed on a vehicle in accordance with one or more embodiments of the present disclosure.
Figure 2B:
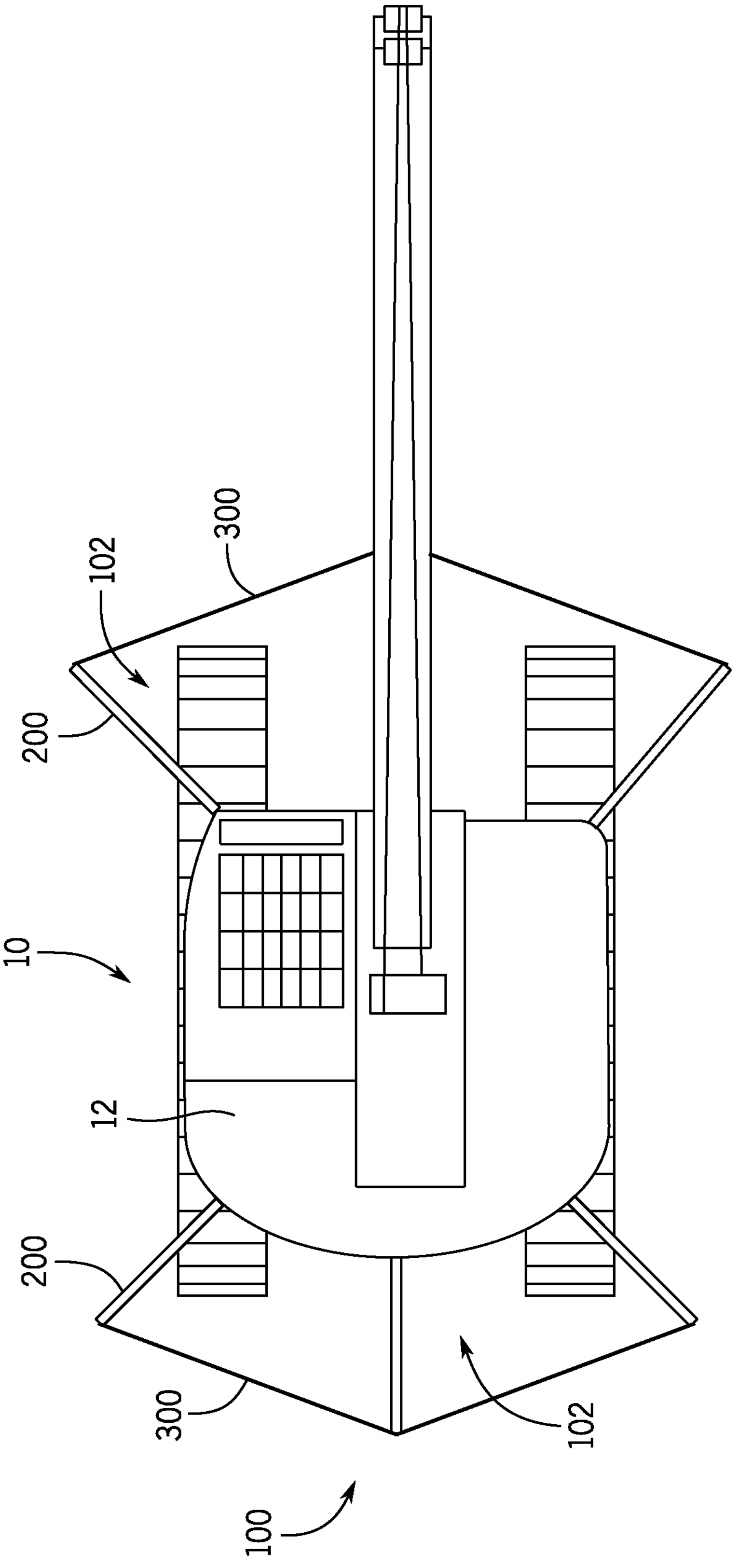
Figure 2C:
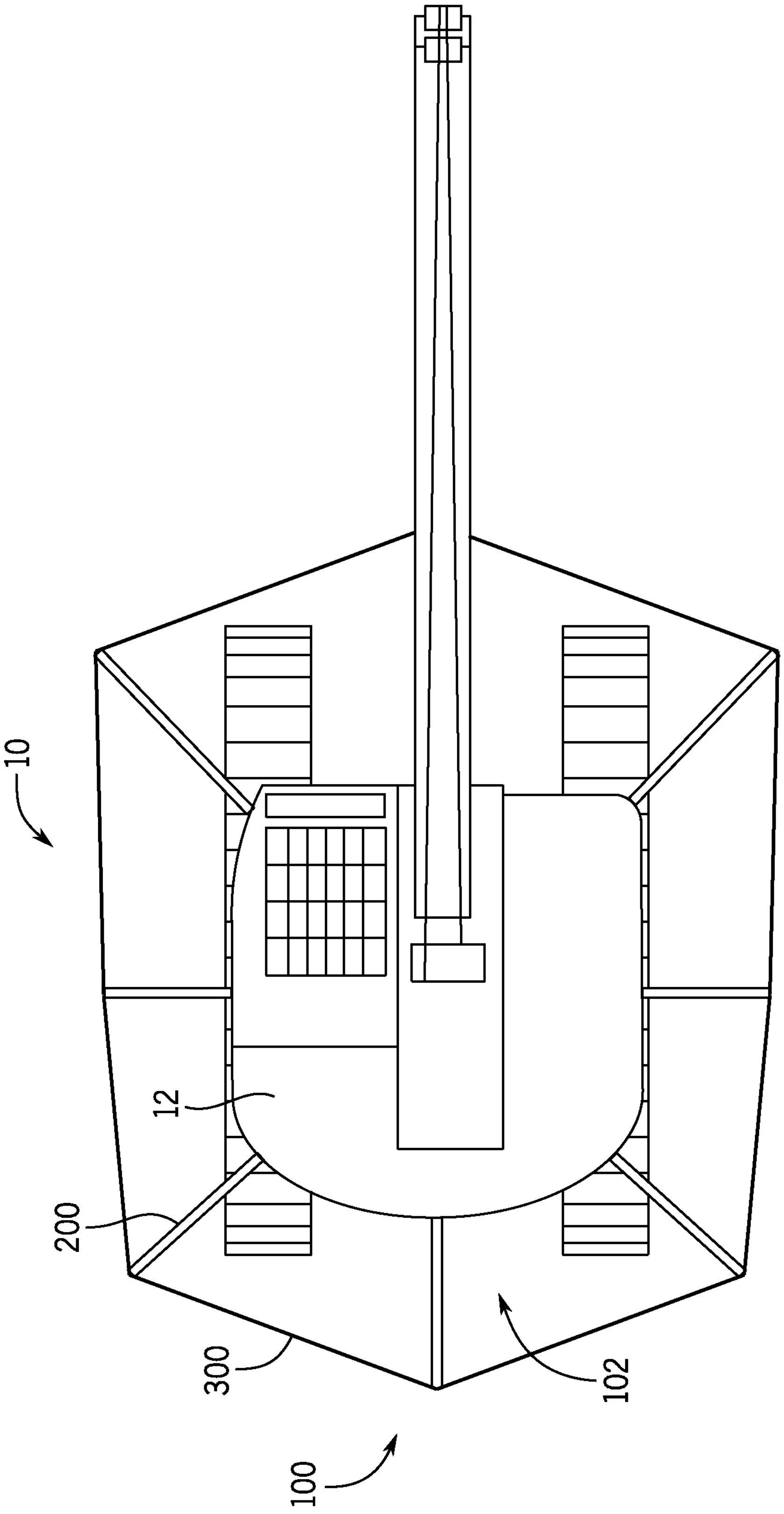

FIGS. 2A-2C illustrate various layouts of the protective system 100 installed on the vehicle 10. As shown in FIG. 2A, the protective system 100 can be installed on one end of the vehicle 10, which forms a protective area 102 at that end of the vehicle 10. As shown in FIG. 2B, in a separate embodiment, the protective system 100 can be installed at two separate locations along the vehicle 10, which forms two separate protective areas 102. As illustrated in FIG. 2C, in another embodiment, the protective system 100 can form a protective area 102 that extends around the entire body 12 of the vehicle 10. Accordingly, a user can couple a protective system 100 to the vehicle 10 in a manner that forms the desired protective area 102.

The layout of the protective system 100 can also be adjusted during use of the vehicle 10 or equipment. For example, a user can start with a protective system 100 as shown in FIG. 2A, then later add additional elongated members 200 and protective lines 300 to form the layout as shown in FIG. 2B or 2C. Accordingly, a user can adjust the protective system 100 as necessary (e.g., to meet differing protection regulations) throughout use of the vehicle 10 or equipment.

In some embodiments, the protective system 100 can be used to form an integrated (or variable) protective system 100. In some examples, this integrated protective system 100 can form a consistent protective area 102 around the vehicle 10 as the vehicle 10 moves (e.g., changes location, changes its orientation, etc.). To form the integrated protective system 100, the protective system 100 can remain fixed in place to the vehicle 10 as the vehicle 10 moves and operates.

Figure 3:
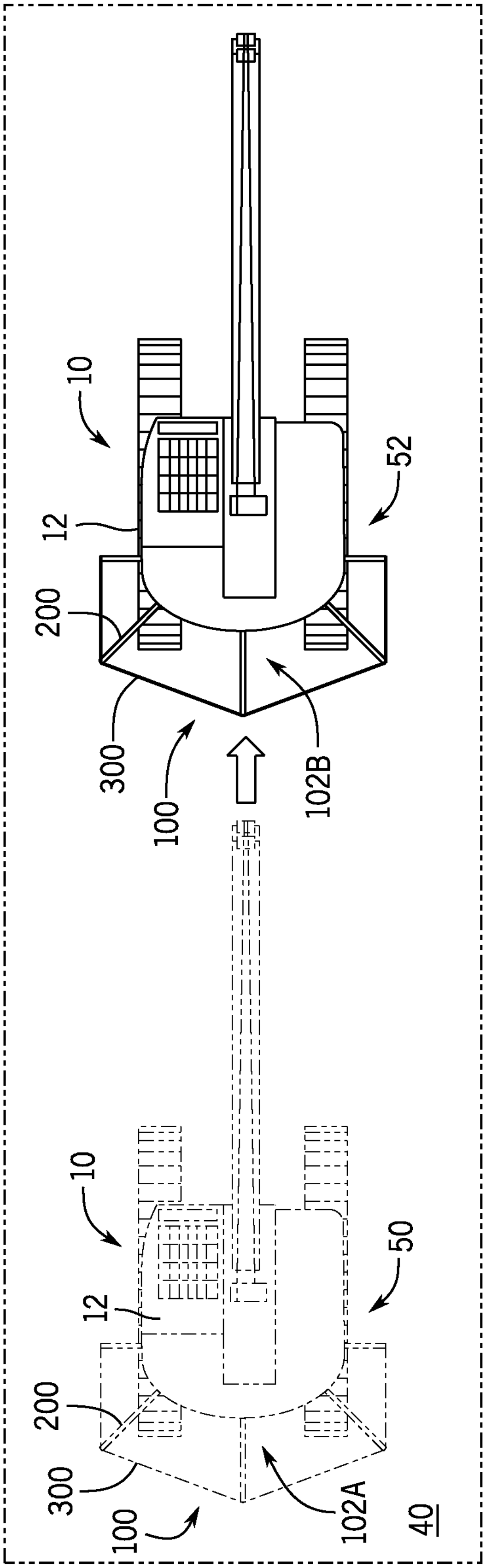
FIG. 3 illustrates a top view of a protective system moving with a vehicle in accordance with one or more embodiments of the present disclosure.

For example, as shown in FIG. 3, the elongated members 200 and the protective line 300 can remain in place on the vehicle 10 as the vehicle 10 moves from a first position 50 to a second position 52. Because the protective system 100 remains fixed in place on the vehicle 10, the protective system 100 can form substantially the same protective area 102 relative to the vehicle 10 despite the vehicle 10 moving from the first position 50 to the second position 52. Thus, in some examples, the protective system 100 can establish a first protective area 102A while the vehicle 10 is at the first position 50 and can establish a second protective area 102B while the vehicle 10 is at the second position 52, with the first and second protective areas 102A, 102B being substantially identical relative to the vehicle 10, but different relative to a ground surface 40.

Figure 4A:
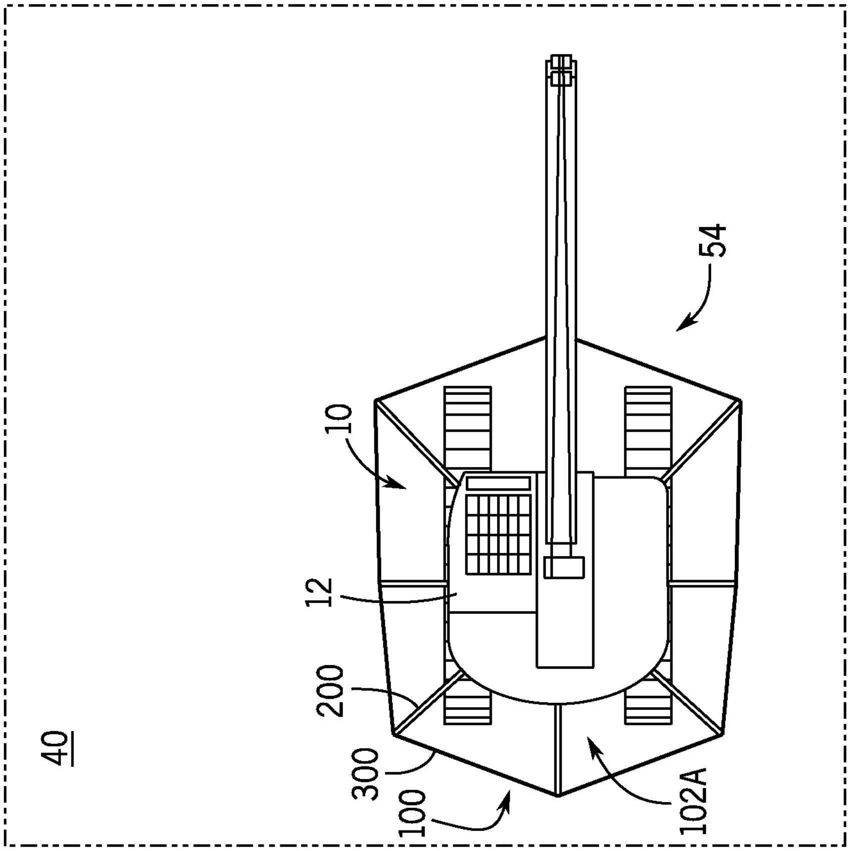
FIGS. 4A and 4B illustrate top views of a protective system moving with a vehicle in accordance with one or more embodiments of the present disclosure.
Figure 4B:
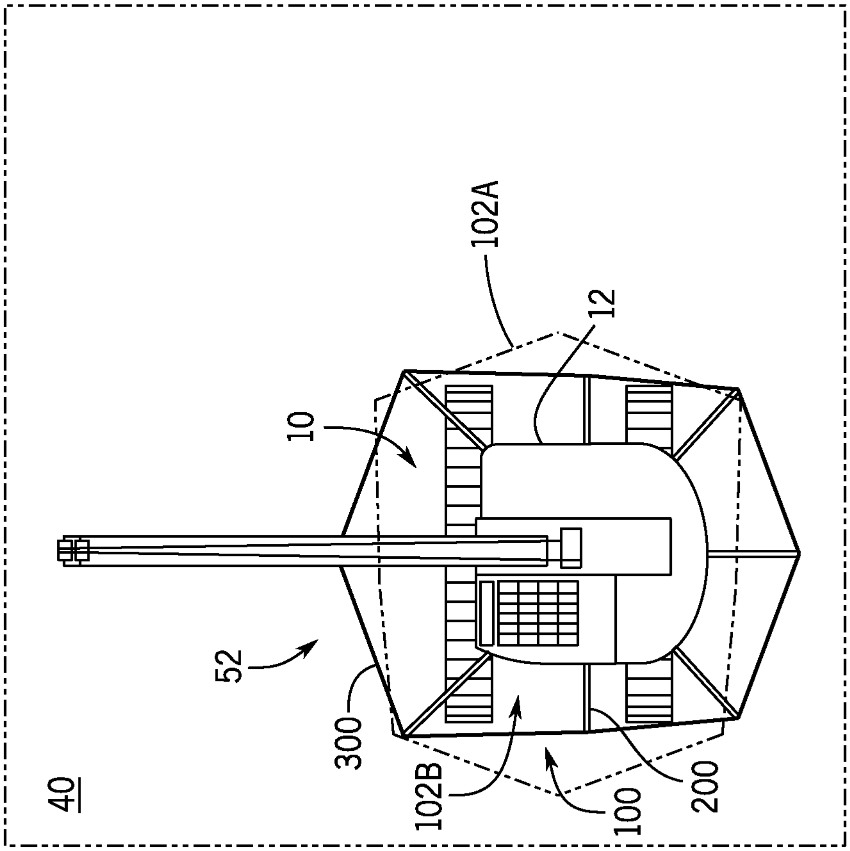

In addition, the protective system 100 can also establish a sufficient protective area 102 (e.g., a protective area that warns others of the potential hazards within the protective area 102) as the vehicle 10 changes its orientation. FIGS. 4A and 4B illustrate the protective system 100 establishing such a protective area 102 as the vehicle 10 rotates from a first position 54 to a second position 56. As shown in FIG. 4A, the protective system 100 (e.g., the elongated members 200 and the protective line 300) forms a first protective area 102A around the vehicle 10 while the vehicle 10 is in the first position 54. As shown in FIG. 4B, the protective system 100 remains fixed to the vehicle 10 as the vehicle 10 rotates from the first position 54 (as shown in FIG. 4A) to the second position 56 (as shown in FIG. 4B). However, while the protective system 100 remains fixed to the vehicle 10, the protective system 100 can move relative to the ground surface 40. Accordingly, in the second position 56, the protective system 100 forms a second protective area 102B. Because the protective system 100 remains fixed to the vehicle 10, both the first and second protective areas 102A, 102B remain formed around at least a portion of the vehicle 10 as the vehicle 10 rotates.

Although the protective system 100 can be fixed to the vehicle 10, in some examples, the protective area 102 can move relative to certain portions of the vehicle 10 as the vehicle 10 moves or operates. For instance, the protective system 100 can be coupled to the cab of a vehicle 10 so that the protective area 102 moves when the cab of the vehicle 10 moves but can remain stationary as a component independent from the cab (e.g., the tracks) move (see, for example, the first and second protective areas 102A, 102B shown in FIG. 4B). In some of these examples, or otherwise, the protective area 102 can still provide adequate protection despite the protective area 102 moving relative to at least a portion of the vehicle 10. For instance, as shown in FIGS. 4A and 4B, the first and second protective areas 102A, 102B can provide an adequate protection (e.g., warn of potential hazards within the protective area 102) despite the vehicle 10 moving from the first position 54 to the second position 56. Thus, the protective area 102 may be configured to guard against potential hazards regardless of the orientation of the protective area 102 with respect to the vehicle 10.

In at least some of the examples described herein, the protective system 100 is described as forming a protective area 102 relative to the vehicle 10. In some examples, the protective area 102 can be described in relation to another location or object, such as the ground. For example, as previously described, the protective area 102 can move relative to the ground as the vehicle 10 moves and operates. Referring to FIGS. 3, 4A, and 4B, as the vehicle 10 moves from one position to another (e.g., the first position 50 to the second position 52, as shown in FIG. 3), the protective area 102 can move along a ground surface 40. Thus, the protective system 100 can define a first protective area 102 in relation to the ground surface 40 when the vehicle 10 is at a first position (e.g., the first position 50 in FIG. 3, first position 54 in FIG. 4A) and can define a second protective area 102 in relation to the ground surface 40 when the vehicle 10 is at a second position (e.g., the second position 52 in FIG. 3, second position 56 in FIG. 4B). In some examples, these various protective areas 102 can be spaced apart from one another. For instance, as shown in FIG. 3, the protective area 102 formed at the first position 50 can overlap an area of the ground surface 40 that may be partially or entirely separate from the area of the ground surface 40 that overlaps the protective area 102 formed at the second position 52. In other examples, portions of the various protective areas 102 can overlap as the vehicle moves. For instance, as shown in FIGS. 4A and 4B, as the vehicle 10 rotates from the first position 54 to the second position 56 the first and second protective areas 102A, 102B can overlap with at least some of the same ground surface 40 from either position.

Figure 5:
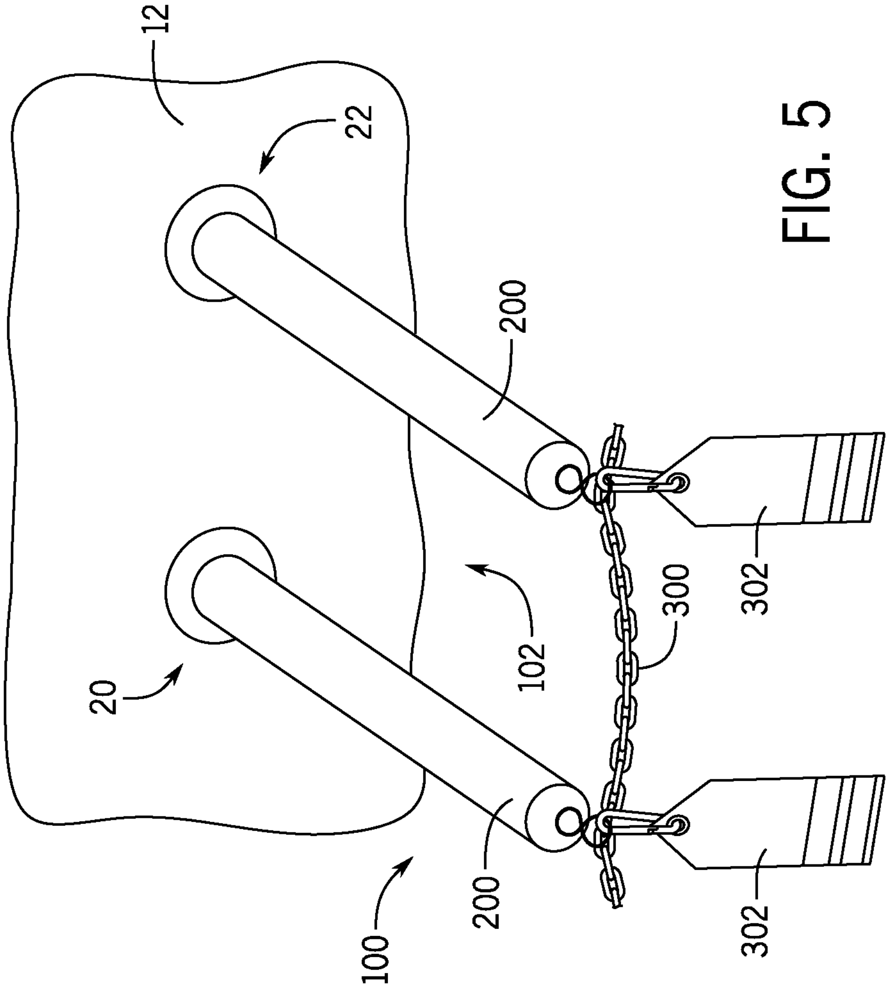
FIG. 5 illustrates a perspective view of a protective system coupled to a body of a vehicle, in accordance with one or more embodiments of the present disclosure.

Referring now to FIG. 5, this FIG. 5 illustrates a protective system 100 coupled to a body 12 of a vehicle 10. As previously described, the protective system 100 can include one or more elongated members 200 that are each coupled to a protective line 300 to define a protective area 102. As shown in the illustrated embodiment, the protective line 300 can couple to both elongated members 200 (e.g., at the respective second ends 204) to define the protective area 102. In some examples, the elongated members 200 can include a coupling member 206 formed at the second end 204 of each elongated member 200, which can be used to couple the protective line 300 to the elongated member 200 and, in some instances, be used to couple the marker member 302 to the elongated member 200. In some of these examples, or otherwise, this coupling member 206 can be an attachment mechanism, such as a loop, a hook, or other suitable attachment mechanism. In various examples, the protective line 300 can be a rope, chain, or other suitable component that can be used to mark a boundary.

The elongated members 200 can couple to the body 12 of the vehicle 10 at any desired coupling position. For example, in the illustrated embodiment, one elongated member 200 can couple to the body 12 at a first coupling position 20 while the other elongated member 200 can couple to the body 12 at a second coupling position 22. These coupling positions 20, 22 can be positioned at any desired location along the body 12 of the vehicle 10, which, in some instances, can assist with forming the desired protective area 102 around the vehicle 10.

Figure 6:
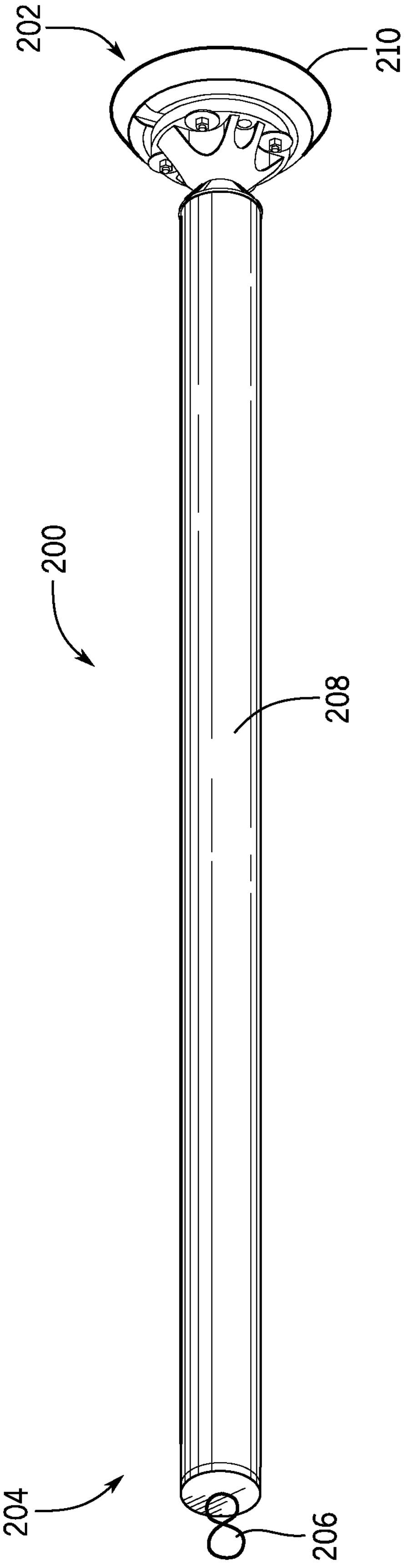
FIG. 6 illustrates a perspective view of a separable magnetic attachment assembly formed in accordance with one or more embodiments of the present disclosure.

FIG. 6 illustrates a perspective view of an elongated member 200. Referring to FIGS. 5 and 6 together, in some embodiments, the elongated member 200 can be formed from an assembly of parts. For example, the elongated member 200 can include a body 208 coupled to an attachment assembly 210 formed at the first end 202 of the elongated member 200. The body 208 can be a post, cylinder, rod, or other elongated component that can be configured to extend outward from the attachment assembly 210 and thereby define at least a portion of the distance that the protective area 102 extends away from the vehicle 10. In some examples, the body 208 can include one or more parts that allow for the body 208 to have a variable length. For instance, the body 208 can include two or more rods that are slidably coupled to one another (e.g., telescoping), which forms an extendable body 208 that allows for the overall length of the body 208 to vary by extending or retracting the rods.

The attachment assembly 210 can be used to couple the elongated member 200 to the body 12 of the vehicle 10. For example, as will be described in more detail herein, the attachment assembly 210 can be a magnetic attachment assembly 210 that is configured to magnetically couple the elongated member 200 to the body 12 of the vehicle 10. In some embodiments, the coupling force between the attachment assembly 210 and the body 12 of the vehicle 10 can be sufficient to maintain the body 208 of the elongated member 200 in its outward trajectory. For example, in some embodiments, the force between the attachment assembly 210 and the body 12 of the vehicle 10 can hold the body 208 in a substantially horizontal manner relative to the ground.

Although the illustrated embodiment shows the elongated member 200 as two separate components, in some embodiments, the elongated member 200 can be configured as a single component. For example, in some embodiments, the elongated member 200 can consist solely of the body 208 without the attachment portion 210. As another example, in some embodiments, the body 208 and the attachment portion 210 are integrally formed.

Figure 7:
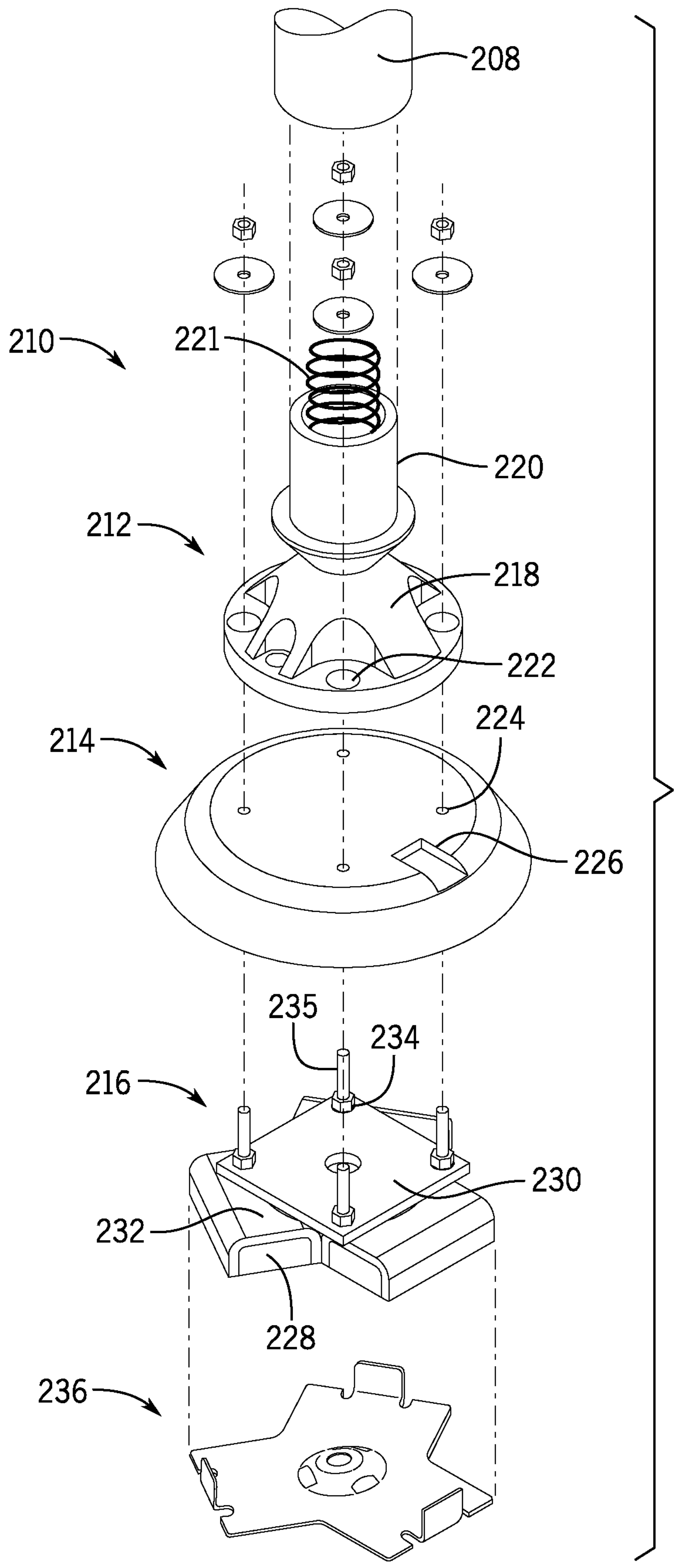
FIG. 7 illustrates an exploded detail view of an embodiment of a separable magnetic attachment assembly shown in FIG. 6.

FIG. 7 illustrates an exploded detail view of an exemplary attachment assembly 210. Referring to FIG. 7, the attachment assembly 210 can include a base 212, a housing 214, and magnet assembly 216 that are all coupled together. The base 212 can be used to couple the attachment assembly 210 to the body 208 of the elongated member 200. The housing 214 can be used to cover the magnetic assembly 216. The magnet assembly 216 can be used to couple the attachment assembly 210 to a device, such as the body 12 of the vehicle 10.

As shown in FIG. 7, the base 212 can include a body 218 having a receiving portion 220 at one end of the body 218 with a biasing member 221 disposed within the receiving portion 220. The receiving portion 220 can be used to couple the base 212 to the body 208. For example, in some embodiments, the body 208 can be formed as a hollow cylinder which can receive the receiving portion 220 within to mate the body 208 with the base 212. In some examples, one or more fasteners can be used to fix the body 208 to the receiving portion 220 or body 218 once the receiving portion 220 is positioned within the body 208. The biasing member 221 can allow for the receiving portion 220 and the body 208 to pivot relative to the rest of the body 218. Accordingly, when another object comes into the contact with the body 208, the body 208 can have some give (e.g., the body 208 will not remain completely rigid) which allows for the body 208 to pivot. This pivoting feature can cushion the object (or person) that comes into contact with the elongated member 200 against any impact. While the biasing member 221 can allow for the elongated member 208 to pivot, the biasing member 221 can nevertheless retain a sufficient stiffness that allows for the base 208 to remain substantially horizontal relative to the ground when installed on a vehicle 10. For example, in some embodiments, the biasing member 221 can be a compressed spring with a spring constant that allows for the elongated member 208 to be within 5 degrees of being parallel to the ground.

The base 212 may include a number of apertures 222 formed through the base 212. These apertures 222 can be used to couple the base 212 to other components of the attachment assembly 210 (e.g., the housing 214, magnet assembly 216) by, for instance, receiving fasteners therethrough.

The housing 214 is a structure that can at least partially receive other components, such as the magnet assembly 216, within. In the illustrated embodiment, the housing 214 is a circular housing. However, other shapes and components are within the scope of the present disclosure. In some examples, the housing 214 can function as a cover for the components received within the housing 214 (e.g., by at least partially shielding these components). The housing 214 can include one or more apertures 224 formed within the housing 214. These apertures 224 can align with the apertures 222 of the base 212 to assist with coupling these components together. Additionally, the housing 214 can include one or more slots 226 formed within a portion of the housing 214. As will be described in more detail herein, a prying tool can interact with these slots 226 to help uncouple the attachment assembly 210 from an attached object (e.g., the body 12 of the vehicle 10).

As shown in FIG. 7, the magnet assembly 216 can include one or more magnets 228 that are coupled to an attachment plate 230. In some examples, each magnet 228 is positioned within a separate U-shaped magnet housing 232, which can cover some of the outer body of the magnets 228. These magnet housings 232 can face away from the base 212 (e.g., such that the open end of the magnet housing 232 is exposed in a direction facing away from the base 212). Additionally, each magnet housing 232 has a first end and a second end, and, when positioned within the magnet assembly 216, the first end of a first magnet housing 232 can be adjacent the second end of a second magnet housing 232. Thus, in some examples, each magnet housing 232 can be positioned end-to-end in a continuous arrangement within the magnet assembly 216. In the illustrated embodiment, the magnet housings 232 are positioned end-to-end in a triangular array configuration to form a triangular magnetic array.

The attachment plate 230 can be coupled to the magnet housings 232 such that the attachment plate 230 is disposed between the magnet housings 232 and the housing 212. The attachment plate 230 can include one or more apertures 234 that can each receive a fastener 235 therein. The apertures 234 can align with the apertures 224 of the housing 214 and the apertures 222 of the base 212. Accordingly, these apertures 222, 224, 234 can be used to couple the magnets 228 to the housing 214, to the base 212, and to the body 208 (e.g., by receiving the fasteners 235 within each aperture 222, 224, 234).

In some embodiments, the magnet housings 232 are made of a material that can carry a magnetic current (e.g., steel or another suitable metal). Such a material allows the magnet housing 232 to attract and attach to an object (e.g., the body 12 of the vehicle 10) during use, as opposed to the magnets 228 attaching directly to the body 12. In general, such arrangement is referred to as a "magnetic cup" assembly, because it is the "cup" itself (not the magnet 228 alone) that is physically connected to a surface capable of carrying a magnetic current (e.g., such as the body 12 of the vehicle 10). As seen in the illustrated embodiment of FIG. 7, the magnet assembly 216 is configured as a triangular array of magnetic cup assemblies. This array can form a strong magnetic connection between the attachment assembly 210 and an object, such as the body 12 of the vehicle 10.

One advantageous effect of the arrangement of the magnets 228 and magnet housings 232 as seen in FIG. 7 is that it provides a magnetic arrangement that is difficult to accidentally remove from the object the attachment assembly 210 is magnetically coupled to. Because the magnets 228 are provided in opposing orientations and at an angle to each other, shearing forces (which would allow the magnet assembly 216 to simply slide off the body 12 of the vehicle 10) are minimized. With shearing forces minimized, the attachment assembly 210 provides a stable (but removable) attachment of the elongated member 200 to the body 12 of the vehicle 10. For such attachment, strong magnets, such as rare-earth magnets (e.g., neodymium magnets or other suitable rare-earth or ceramic magnets) can be used.

In some embodiments, the strength of the magnets 228 will be significant (e.g., having a magnetic pull of over 200 psi). If such magnets are attached directly to the body 12 of the vehicle 10, the task of manually separating these parts may become too difficult for the average user. As previously mentioned, the slot 226 in the housing 214 can allow for a user to pry the magnet assembly 216 from the vehicle 10 using a prying tool. In one example, the prying tool can include a lever-type prying device that can be inserted into the slot 226 to grip the attachment plate 230 (e.g., be positioned between the attachment plate 230 and the magnet housings 232) and rotate about a fulcrum to pry the magnet assembly 216 away from the attached surface.

In some uses of the elongated member 200, the user would prefer to be able to remove the elongated member 200 from the attached object without using a prying tool. To enable such removal without a prying tool, an optional shim plate 236 (as shown in FIGS. 7-9) can be used with the attachment assembly 210 to decrease the degree of magnetic coupling between the attachment assembly 210 and the attached object (e.g., the body 12 of the vehicle).

Figure 8:
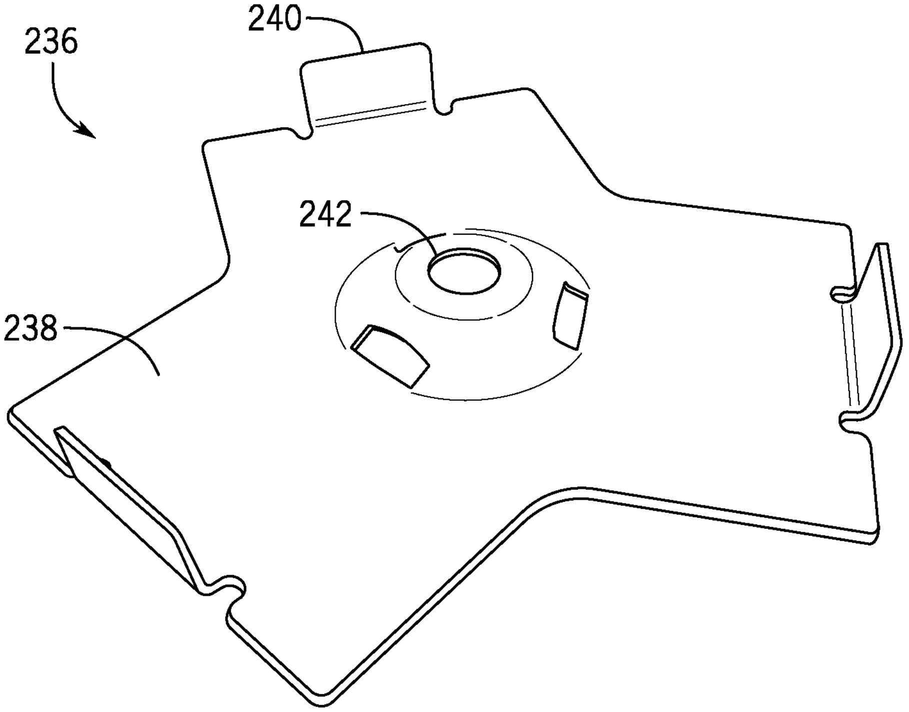
FIG. 8 illustrates a top-down perspective view of an exemplary shim plate in accordance with one or more embodiments of the present disclosure.
Figure 9:
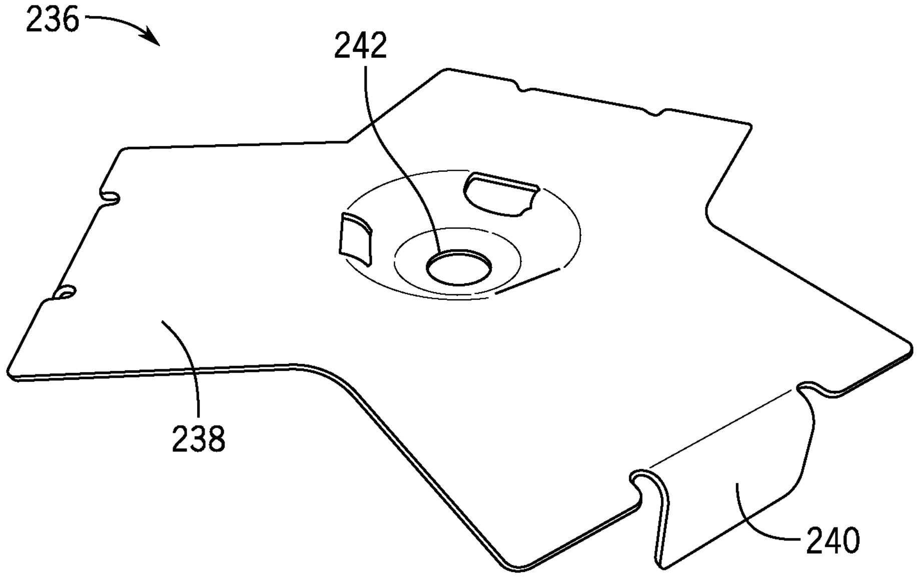
FIG. 9 illustrates a bottom-up perspective view of the exemplary shim plate shown in FIG. 8.

Referring to FIGS. 7-9, the shim plate 236 is a component designed and configured to cover the exposed surface of the magnet assembly 216. In some examples, when coupled to the magnet assembly 216, the shim plate 236 can space the magnet assembly 216 from the attached object. Additionally, the shim plate 236 can made from a non-magnetic material (such as plastic, aluminum, etc.) and, because the shim plate 236 spaces the magnet assembly further from the attached object, the shim plate 236 can have the effect of reducing the magnetic strength between the magnet assembly 216 and the attached object. In one non-limiting example, the shim plate 236 may reduce the magnetic strength (e.g., reduce the magnetic current) between the magnet assembly 216 and the attached object in a range of about 40% to about 60%.

The shim plate 236 can include several features to aid in its coupling to the magnet assembly 216. In one example, the shim plate 236 can include a planar surface 238 designed to mate with the magnet assembly 216. This planar surface 238 can be generally Y-shaped to align with the magnet housing 232 of the magnet assembly 216. In another example, the shim plate 236 can further include a plurality of side arms 240 for reaching around the sides of the magnet assembly 216 and preventing the shim plate 236 from sliding out of attachment with the magnet assembly 216 in any direction. As another example, the shim plate 236 can include a recessed aperture 242 at the center point of the shim plate 236. This recessed aperture 242 allows for attachment of the shim plate 236 to the magnet assembly 216 using a fastener (not shown) that may be countersunk in the recessed aperture 242.

Although the shim plate 236 can work to reduce to the strength of the magnetic coupling between the attachment assembly 210 and the attached object, the positioning of the individual magnets 228 within the magnet assembly 216 can result in a non-uniform force applied to the attached object. This arrangement can require different levels of energy to uncouple the attachment assembly 210 from the attached object depending on the direction that the shearing or pulling effort originates from in relation to the positioning of the magnets 228. Thus, in some instances, it can be easier to uncouple the attachment assembly 210 from the attached object when a force is applied in a particular direction relative to the positioning of the magnets 228. In some examples, the attachment assembly 210 and/or the body 208 can include a marking to indicate where a force can be most effectively applied to uncouple the elongated member 200 from the attached object. In some of these examples, or otherwise, this marking is in a direction that is perpendicular to the sides of one of the magnets 228.

In various embodiments, a user can uncouple the attachment assembly 210 from an attached object by pivoting the body 208 relative to attachment assembly 210. As previously described, the attachment assembly 210 can include a biasing member 221 which allows for the body 208 to pivot. In some instances, when a user pushes the body 208 so that the body 208 pivots relative to the attachment assembly 210, the resulting force from the biasing member 221 can be great enough to overcome the magnetic coupling from the magnet assembly 216, which thereby uncouples the attachment assembly 210 from the attached object.

In some embodiments, a user may want to couple the elongated member 200 to an object that is not magnetic. For example, the body 12 of the vehicle 10 may not be capable of carrying a magnetic current, and thus, the elongated member 200 would be unable to directly couple to the body 12 via the magnets 228 from the attachment assembly 210. In some of these embodiments, or otherwise, the protective system 100 can be modified so that the elongated member 200 can couple to the body 12 of the vehicle 10. For example, in some embodiments, the base 212 of the attachment assembly 210 can be directly fastened to the body 12 of the vehicle 10. As another example, a magnetic component can be installed on the body 12 of the vehicle 10, which allows for the elongated member 200 to couple to the vehicle 10 by magnetically coupling to the magnetic component.

Figure 10:
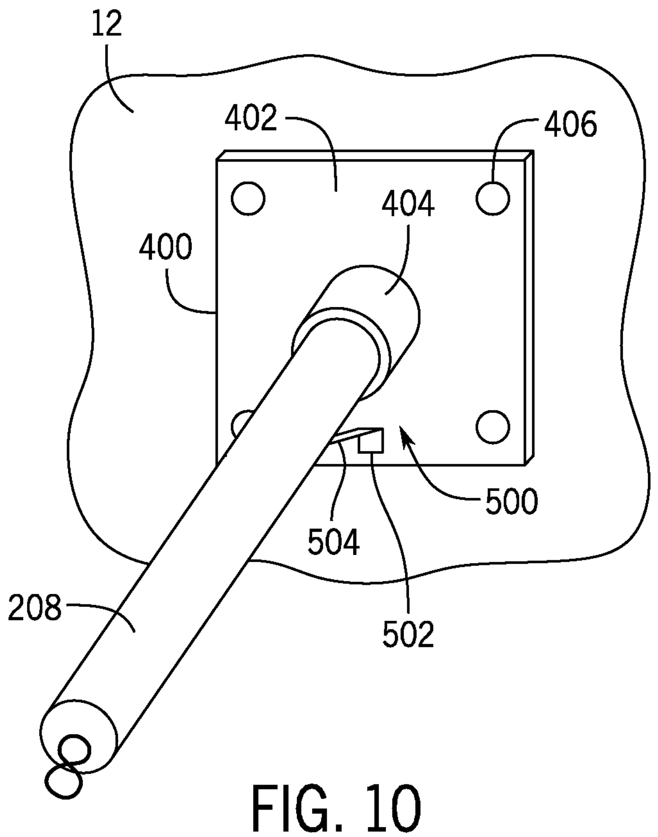
FIG. 10 illustrates a perspective view of a support member coupled to an elongated member in accordance with one or more embodiments of the present disclosure.

In various embodiments, a receiving member 400 can be installed on the vehicle 10 to assist with coupling the elongated member 200 to the vehicle 10. FIG. 10 illustrates the receiving member 400 coupled to the body 12 of the vehicle. As shown in FIG. 10, the receiving member 400 can include a base 402 with a receiving portion 404 extending outwards from the base 402. The base 402 can include one or more apertures 406 positioned around the base 402, which can be used to couple the base 402 to the body 12 of the vehicle 10. The receiving portion 404 can form a hollow cylinder shape, allowing for the body 208 of the elongated member 200 to be received within. In some examples, a fastener (e.g., a thumb screw, interlock, etc.) can be used with the receiving portion 404 to secure the elongated member 200 within the receiving portion 404.

As illustrated in FIG. 10, in some embodiments, a supporting member 500 can couple to the elongated member 200. This supporting member 500 can be used to support the elongated member 200 by helping maintain the elongated member 200 in the desired orientation and to prevent the elongated members 200 from sagging. As shown in the illustrated embodiment, a first end 502 of the supporting member 500 can couple to the base 402 of the receiving member 400 while a second end 504 couples the body 208 of the elongated member 200. Although the first end of the supporting member 500 is illustrated as being coupled to the receiving member 400, those of ordinary skill in the art will appreciated that the supporting member 500 can be coupled to another component (e.g., the body 12 of the vehicle 10) to aid in supporting the elongated member 200.

Figure 11:
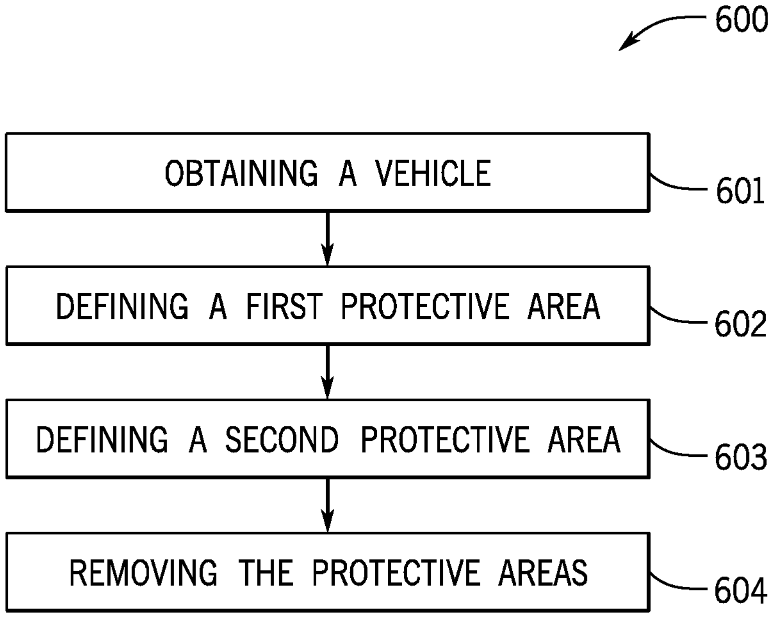
FIG. 11 is a flow diagram illustrating a method of defining a variable protective for a vehicle in accordance with one or more embodiments of the present disclosure.

FIG. 11 is a flow diagram illustrating an example method 600 of defining a variable protective area relative to a ground surface. The method 600 can be performed with any of the embodiments described herein, including the protective system 100.

At step 601, the method 600 begins with obtaining a vehicle. The vehicle (e.g., the vehicle 10) can be construction vehicle (e.g., a crane, a bulldozer, an excavator, etc.) where the operator would like to establish a protective area (such as the protective area 102) around the vehicle. In some examples, this vehicle can be one that includes a swing radius (e.g., the swing radius of a crane) that varies based on the orientation of the vehicle relative to the ground surface. Thus, in some examples, the obtained vehicle can be one that operates within a specified area. In some embodiments, the method 600 can begin with obtaining equipment instead of a vehicle.

At step 602, the method 600 includes defining a first protective area for the vehicle. In some examples, this first protective area (e.g., the protective area 102) can define the potentially hazardous space that surrounds the vehicle. For example, when the vehicle is a crane, the first protective area can be the area around the crane that exposes workers and other personal to potential dangers from the crane (e.g., from being pinched by the crane). In some examples, the first protective area is defined by a protective system (e.g., the protective system 100). This protective system can include one or more elongated members (e.g., the elongated members 200) and a protective line (e.g., the protective line 300) that is coupled to each of the elongated members. To define the first protective area, a user can install protective system on the vehicle by coupling one or more elongated members to the vehicle and linking the ends of the elongated members with a protective line so that the protective line extends between the elongated members and thereby defines the protective area.

In some embodiments, the users can establish the first protective area for when the vehicle is in a first position. For example, the first protective area can be used to define the hazardous zone around the vehicle (relative to a ground surface) while the vehicle is at a first location. In other examples, the first protective area can be used to define the hazardous zone around the vehicle (relative to a ground surface) when the vehicle is in a particular orientation (e.g., while the crane is hoisting a load).

In some examples, the users can improve the visibility of the first protective area by installing one or more marker members (e.g., the marker members 302). These marker members can couple to one or more portions of the protective system to help notify people of the first protective area.

At step 603, the method 600 optionally includes defining a second protective area for the vehicle. Similar to the first protective area, the second protective area can define the potentially hazardous space that surrounds the vehicle. However, in some examples, the second protective area can differ from the first protective area based on the location of the vehicle. Thus, in some examples, the second protective area can be formed when the vehicle transitions from a first position (e.g., the first position 50, first position 54) to a second position (e.g., the second position 52, second position 56). For instance, when the vehicle is at a first location, the protective system can define a first protective area relative to the ground. When the vehicle moves to a second location, the protective system can define a second protective area relative to the ground that is different from the first protective area.

In some embodiments, the second protective area can be different from the first protective area though modifying the protective system. For example, one or more elongated members can be coupled to the protective system to make the second protective area larger than the first protective area. In various embodiments, the second protective area is formed using the same components that formed the first protective area.

At step 604, the method 600 optionally includes removing the protective areas. To remove the protective areas, a user can uncouple the elongated members and protective line from the vehicle. In some examples, a user can use a tool or other equipment to remove the elongated members from the body of the vehicle. After a user uncouples the elongated members from the vehicle, the user can then stow the elongated members and protective line (or otherwise remove the protective system from the area surrounding the vehicle) so that the protective system can no longer define the protective area around the vehicle.

This disclosure is not intended to be exhaustive or to limit the present technology to the precise forms disclosed herein. For instance, although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Furthermore, although steps of methods may be presented herein in a particular order, in alternative embodiments the steps may have another suitable order, including being performed concurrently in a parallel process when possible.

Certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. The embodiments have been particularly shown and described, but it will be understood that various changes in form and details may be made. For example, although various embodiments have been described as having particular features and/or combinations of components, other embodiments are possible having any combination or sub-combination of any features and/or components from any of the embodiments described herein. The specific configurations of the various components can also be varied. For example, the size and specific shape of the various components can be different than the embodiments shown, while still providing the functions as described herein. Furthermore, in some examples, the illustrations describing some embodiments can hide particular features of the embodiment so as to not obscure the illustration of other features within the embodiment. Accordingly, this disclosure and associated technology can encompass other embodiments not expressly shown and/or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments. Where appropriate, relative terms, such as "about," "substantially," and "approximately," can be understood to incorporate standard tolerances. For example, two members that are "substantially parallel" may be understood to mean two members that are parallel within standard engineering tolerances.

I claim:

1. A system for defining a protective area for a vehicle body, the system comprising:

a first elongated member being substantially straight and removably and magnetically coupled to the vehicle body at a first coupling position such that the first elongated member extends outwardly in a substantially horizontal direction from the vehicle body, the first elongated member having a first end and a second end, the first end including a first magnetic attachment assembly configured to removably and magnetically couple the first elongated member to the vehicle body and the second end extending distally from the first end in a substantially horizontal direction, wherein the first magnetic attachment assembly includes a biasing member for pivoting the first elongated member relative to the first magnetic attachment assembly in response to an object contacting the first and/or second elongated member;

a second elongated member being substantially straight and removably and magnetically coupled to the vehicle body at a second coupling position such that the second elongated member extends outwardly in a substantially horizontal direction from the vehicle body, the second elongated member having a first end and a second end, the first end including a second magnetic attachment assembly configured to removably and magnetically couple the second elongated member to the vehicle body and the second end extending distally from the first end in a substantially horizontal direction, wherein the second magnetic attachment assembly includes a biasing member for pivoting the second elongated member relative to the second magnetic attachment assembly in response to an object contacting the first and/or second elongated member; and a protective line extending between the respective second ends of the first and second elongated members to define the protective area.

2. The system of claim 1, wherein the biasing member is a spring.

3. The system of claim 1, wherein a tool is configured to uncouple the first and/or second elongated member from the vehicle body.

4. The system of claim 1, wherein the first and/or second elongated member is configured to uncouple from the vehicle body in response to a force being applied to the elongated member along a first direction.

5. The system of claim 1, further comprising a third elongated member coupled to the vehicle body at a third coupling position to extend outwardly from the vehicle body, the third elongated member having a first end and a second end, the first end coupled to the vehicle body and the second end extending distally from the first end, wherein the protective line is received at the second end of the third elongated member.

6. The system of claim 1, wherein the first and/or second elongated member is extendable such that the first elongated member can have a variable length.

7. The system of claim 1, wherein the protective area extends outwardly from the vehicle body by a length of at least five feet.

8. The system of claim 1, wherein the first elongated member has a first length and the second elongated member has a second length, and wherein the first length is different than the second length.

9. A method of defining a protective area relative to a ground surface, the method comprising:

obtaining a vehicle, wherein the vehicle can move between a first position and a second position;

defining a first protective area for the vehicle when the vehicle is in the first position, wherein the first protective area is defined at least in part by:

a first elongated member being substantially straight, removably and magnetically coupled to a body of the vehicle, and extending outwardly in a substantially horizontal direction, wherein the first elongated member includes a first magnetic attachment assembly configured to removably and magnetically couple the first elongated member to the body of the vehicle, wherein the first magnetic attachment assembly includes a biasing member for pivoting the first elongated member relative to the first magnetic attachment assembly in response to an object contacting the first and/or second elongated member;

a second elongated member being substantially straight, removably and magnetically coupled to the body of the vehicle, and extending outwardly in a substantially horizontal direction, wherein the second elongated member includes a second magnetic attachment assembly configured to removably and magnetically couple the second elongated member to the body of the vehicle, wherein the second magnetic attachment assembly includes a biasing member for pivoting the second elongated member relative to the second magnetic attachment assembly in response to an object contacting the first and/or second elongated member; and a protective line extending between the first and second elongated members; and defining a second protective area for the vehicle when the vehicle is in the second position, wherein the second protective area is defined at least in part by the first elongated member, the second elongated member, and the protective line extending between the first and second elongated members.

10. The method of claim 9, wherein the first protective area is different from the second protective area.

11. The method of claim 10, wherein the first protective area does not overlap with the second protective area.

12. The method of claim 9, wherein the first elongated member couples to the body of the vehicle at a first position, and wherein the second elongated member couples to the body of the vehicle at a second position.

13. The method of claim 12, wherein the first and second elongated members remain fixed at the first and second positions as the vehicle moves between the first position and the second position.

14. The method of claim 9, wherein the first elongated member has a first length and the second elongated member has a second length, and wherein the first length is different than the second length.

15. The method of claim 9, wherein the first and second elongated members each include a first and second end, and wherein the protective line extends between the second ends of the first and second elongated members.

16. The method of claim 9, further comprising removing the first and second protective areas by decoupling the first and second elongated members from the body of the vehicle.

17. The method of claim 9, wherein the vehicle is a crane having a swing radius, and wherein the first and second protective areas surround the swing radius of the crane.

* * * * *